F. G. P. LEAO.
COFFEE ROASTER.
APPLICATION FILED JULY 19, 1917.
1,279,557.
Patented Sept. 24, 1918.
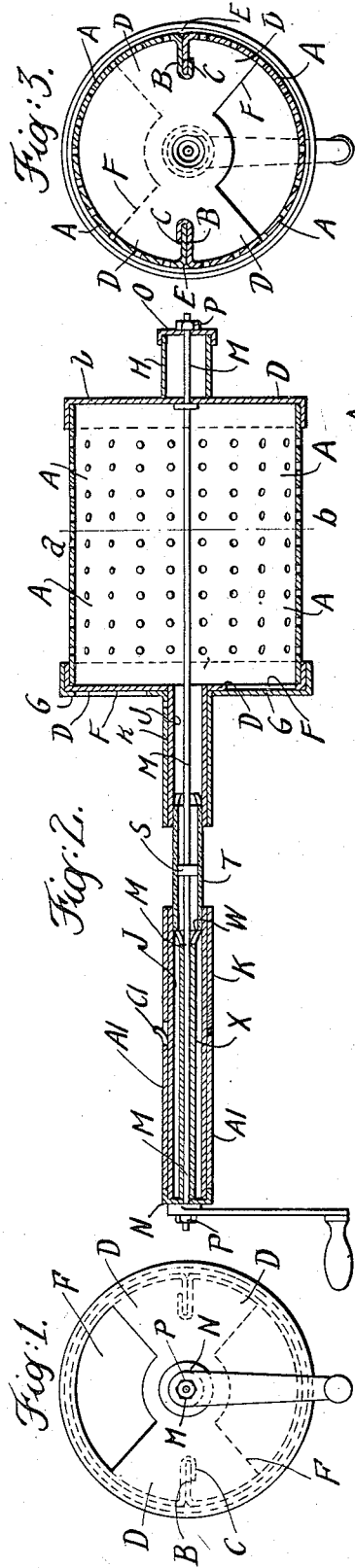
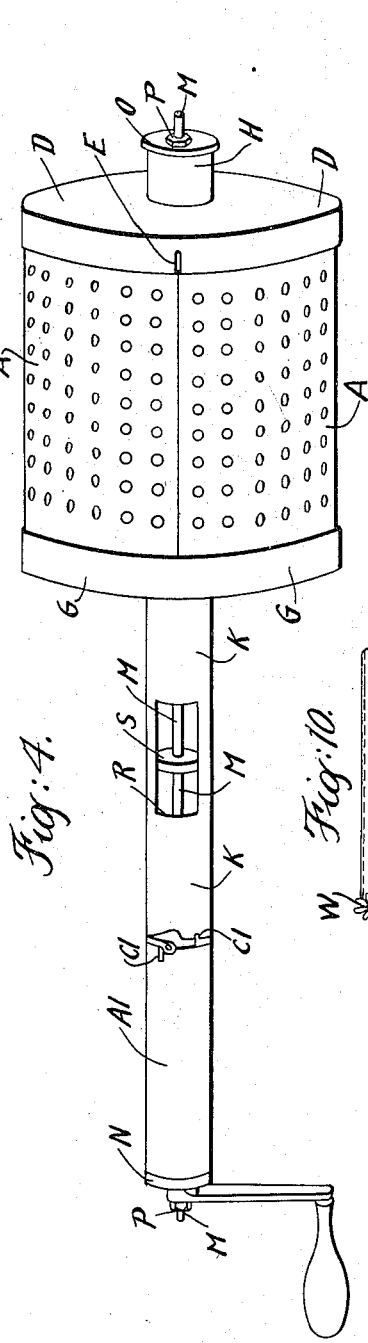
INVENTOR
Francisco G. P. Leao
BY
Edwards, Sager & Richmond,
ATTORNEYS.

UNITED STATES PATENT OFFICE.

FRANCISCO GARCIA PEREIRA LEAO, OF GLASGOW, SCOTLAND.

COFFEE-ROASTER.

1,279,557.    Specification of Letters Patent.    Patented Sept. 24, 1918.

Application filed July 19, 1917. Serial No. 181,661.

*To all whom it may concern:*

Be it known that I, FRANCISCO GARCIA PEREIRA LEAO, a citizen of Brazil, residing at Glasgow, in the county of Glasgow, Scotland, have invented certain new and useful Improvements in Coffee-Roasters, of which the following is a specification.

The invention relates to roasting apparatus for coffee and the like and more particularly adapted for domestic use.

The invention has for its object to provide firstly in such apparatus means for viewing the coffee and for comparing it with a finished sample during the process of roasting which sample is carried in the apparatus. And secondly, the invention has for its object to provide an apparatus easily dismembered so that it may be stowed in small space and easily erected for use.

An example of the improved apparatus is shown upon an accompanying sheet of explanatory drawings in which Figure 1 is an end view, Fig. 2 a longitudinal sectional elevation, Fig. 3 a transverse section on the line *a—b* and Fig. 4 a perspective elevation, while Figs. 5 to 10 are views of details hereinafter referred to.

The body of the apparatus consists of two semi-cylindrical parts A (Fig. 5) having inturned flanges B one of which on each part is folded upon itself at C to form mutual engaging means. These inturned flanges further serve as baffles for distributing the coffee. Lid parts D engage the assembled parts A and have indentations E engaging between the joints thereof. The lid part D toward the extended trunnion has in it a "hit-and-miss" aperture F which may be covered or uncovered by a like aperture in the supplementary lid G. The short trunnion H the long trunnion J (Fig. 6) and the sleeve K (Fig. 7) on the latter have on their ends clutch parts L which engage small counterpart apertures formed near the central openings of the lids D, G.

A tie rod M passes from end to end of the whole, and by means of caps N, O and nuts P braces the structure together.

The long trunnion J has in it apertures R. Dividing the space here is a partition S strung on the rod M, while a tube T of glass, mica, wire or similar material held between an inward projection V in the trunnion J and a disk W on a sleeve X (Fig. 10) abutting the cap N serves for examination of the contents of chambers on each side of the partition—that toward the end of the trunnion having in it a properly roasted sample, while into that toward the vessel may be tilted a sample of what is being roasted. The distance of the sample compartment from the vessel is of course such that the sample is not affected by the heat of roasting. Into the other compartment a specimen of the coffee being roasted may at any time be introduced by tilting the vessel and similarly be returned to the vessel. Thus the roasting coffee may be compared with the greatest of ease at any time during roasting with the sample, and thus the coffee may be roasted by the most unskilled to the correct degree with certainty.

The outer sleeve K (Fig. 7) has also apertures Y in it. Between it and the cap N is another sleeve $A^1$ (Fig. 8) which is locked to the cap by beads on the latter which engage slots $B^1$ in it, while a detent spring $C^1$ engaging apertures in the edges of the sleeves K, $A^1$ serves to lock the sleeve K—by which is controlled the "hit-and-miss" lid G.

The apparatus may be supported by any convenient means engaging the trunnions over a heating device.

It is apparent that the first part of the invention may be applied to a non-demountable form of apparatus, while the carrying out of the second part may be somewhat widely varied in detail.

I claim:—

1. In a roasting machine of the type having a rotatable vessel carried on trunnions, a laterally-extended trunnion in which is provided a partitioned space to retain a sample and another space to receive material from the vessel, and glazed or protected apertures by which to view the spaces which are preferably adjacent to one another.

2. In a roasting machine, in combination, a cylindrical body formed of two or more segmental cylindrical parts having inturned flanges adapted to engage one another, lid-like end parts engaging the assembled body parts, hollow tubular trunnion parts engaging the end parts, a longitudinal tie rod and caps embracing and tying the whole together, and means for charging and discharging material.

3. In combination with a rotatable roasting vessel, a lengthy hollow trunnion having apertures therein, a glass or other protecting covering for the apertures and a partition dividing the space behind the apertures as set forth.

4. In the apparatus forming the subject-matter of claim 1, a lid part having a "hit-and-miss" aperture therein and a supplementary lid rotatable thereon having a mating aperture, and means for locking the supplementary lid.

5. In a roasting machine, the combination with a rotatable vessel adapted to contain the material being roasted, of a passage extending therefrom adapted to receive a specimen of the roasted material, and a transparent window in said passage through which said specimen may be observed.

6. In a roasting machine, the combination with a rotatable vessel adapted to contain the material being roasted, of a passage extending therefrom adapted to receive a specimen of the roasted material, a transparent window in said passage through which said specimen may be observed, and a pocket adjacent said window for containing a sample of properly roasted material.

7. In roasting apparatus, the combination with a roasting vessel adapted to contain the material to be treated, of means for providing a representation of properly roasted material, and means for temporarily bringing said representation and a sample of the material being roasted into view adjacent each other for comparison so as to determine the desired duration of roasting.

In testimony whereof I have signed my name to this specification in the presence of two subscribing witnesses.

FRANCISCO GARCIA PEREIRA LEAO.

Witnesses:
   HENRY MASON,
   KATHERINE FOTHERINGHAM.